US012026968B2

(12) United States Patent
Huang et al.

(10) Patent No.: US 12,026,968 B2
(45) Date of Patent: Jul. 2, 2024

(54) TRAINING MACHINE LEARNING-BASED MODELS FOR ANIMAL FEATURE DETECTION

(71) Applicant: SONY GROUP CORPORATION, Tokyo (JP)

(72) Inventors: Sangxia Huang, Malmö (SE); Chengxi Li, Lund (SE)

(73) Assignee: Sony Group Corporation, Tokyo (JP)

( * ) Notice: Subject to any disclaimer, the term of this patent is extended or adjusted under 35 U.S.C. 154(b) by 370 days.

(21) Appl. No.: 17/489,528

(22) Filed: Sep. 29, 2021

(65) Prior Publication Data
US 2022/0147738 A1 May 12, 2022

(30) Foreign Application Priority Data

Nov. 12, 2020 (SE) .................................. 2051319-8

(51) Int. Cl.
*G06V 40/10* (2022.01)
*G06F 18/21* (2023.01)
(Continued)

(52) U.S. Cl.
CPC ............ *G06V 40/10* (2022.01); *G06F 18/214* (2023.01); *G06F 18/217* (2023.01); *G06T 7/73* (2017.01);
(Continued)

(58) Field of Classification Search
CPC .......... G06V 40/10; G06V 10/44; G06T 7/73; G06T 2207/20081; G06F 18/217; G06F 18/214
See application file for complete search history.

(56) References Cited

U.S. PATENT DOCUMENTS

| 10,402,657 B2* | 9/2019 | Szeto ..................... G06V 20/46 |
| 2017/0329755 A1* | 11/2017 | Liu ........................ G06V 20/70 |

(Continued)

FOREIGN PATENT DOCUMENTS

| CN | 110414369 A | 11/2019 |
| CN | 110457999 A | 11/2019 |

(Continued)

OTHER PUBLICATIONS

Office Action and Search Report from corresponding Swedish Application No. 2051319-8, Aug. 11, 2021, 8 pages.
(Continued)

*Primary Examiner* — Pinalben Patel
(74) *Attorney, Agent, or Firm* — Tucker Ellis LLP

(57) ABSTRACT

A method for processing images of animals obtains first training data, which includes first images of animals and first annotation data including first location data for predefined feature points on at least one animal in each image in the first images, and trains a first machine learning-based model (MLM) by use of the first training data to generate a first trained MLM. The method obtains second images of animals, operates the first trained MLM on the second images to generate second annotation data comprising second location data for the predefined feature points on at least one animal in each image in the second images, and aggregates at least a subset of the first and second images, and a corresponding subset of the first and second annotation data, into second training data, which thereby is expanded in relation to the first training data.

18 Claims, 5 Drawing Sheets

(51) Int. Cl.
*G06F 18/214* (2023.01)
*G06T 7/73* (2017.01)
*G06V 10/44* (2022.01)

(52) U.S. Cl.
CPC .... *G06V 10/44* (2022.01); *G06T 2207/20081* (2013.01)

(56) References Cited

U.S. PATENT DOCUMENTS

| | | | |
|---|---|---|---|
| 2019/0130218 A1 | 5/2019 | Albright | |
| 2019/0325275 A1* | 10/2019 | Lee | G06V 30/19167 |
| 2019/0392587 A1 | 12/2019 | Nowozin | |
| 2020/0279428 A1 | 9/2020 | Guay | |
| 2020/0380723 A1* | 12/2020 | Mukherjee | G06T 7/251 |
| 2022/0027671 A1* | 1/2022 | Mukherjee | G06V 20/20 |

FOREIGN PATENT DOCUMENTS

| | | |
|---|---|---|
| CN | 111297367 A | 6/2020 |
| CN | 111680551 A | 9/2020 |
| KR | 101969050 B1 | 4/2019 |
| WO | 2020007363 A1 | 1/2020 |

OTHER PUBLICATIONS

Ke Sun et al., "Deep High-Resolution Representation Learning for Human Pose Estimation," University of Science and Technology of China, arXiv: 1902.09212v1; Feb. 25, 2019, 12 pages.

Jinkun Cao et al., "Cross-Domain Adaptation for Animal Pose Estimation," Shanghai Jiao Tong University, arXiv: 1908-05806v2, Aug. 19, 2019, 12 pages.

Zhe Cao et al., "OpenPose: Realtime Multi-Person 2D Pose Estimation using Part Affinity Fields," IEEE Transactions on Pattern Analysis and Machine Intelligence, arXiv: 1812.08008v2, May 30, 2019, 14 pages.

* cited by examiner

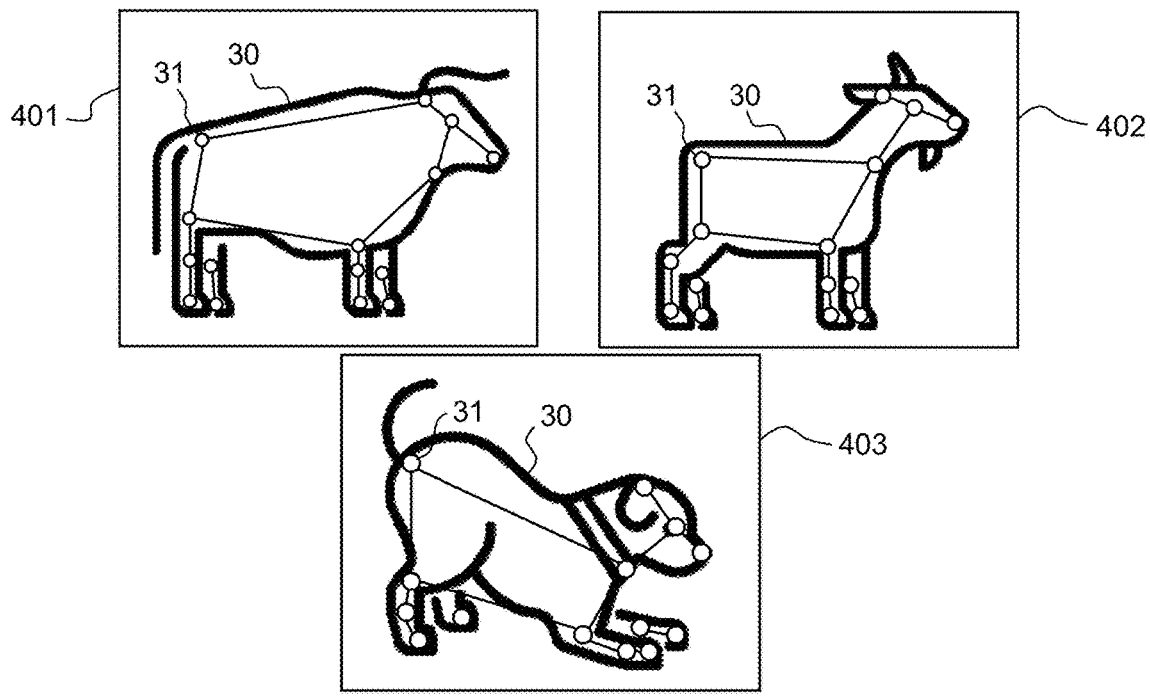
FIG. 4B
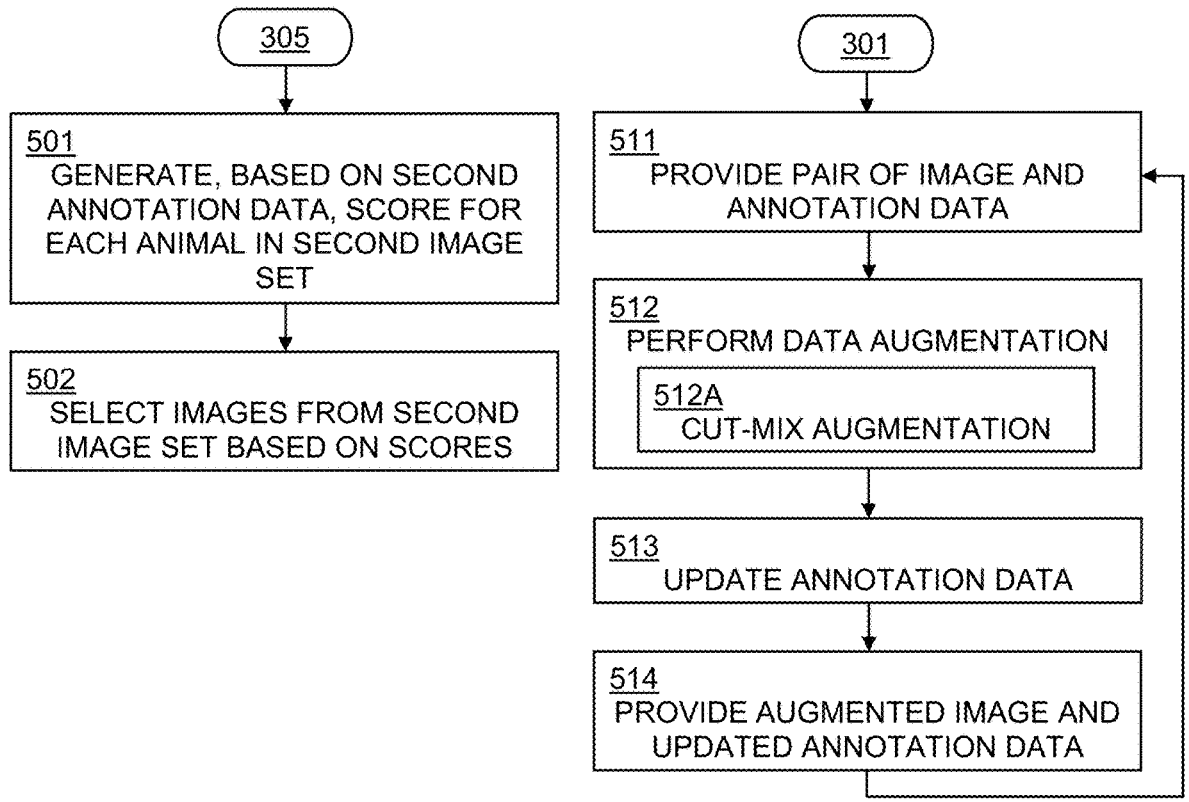
FIG. 5A
FIG. 5B

TRAINING MACHINE LEARNING-BASED MODELS FOR ANIMAL FEATURE DETECTION

RELATED APPLICATION DATA

This application claims the benefit of Swedish Patent Application No. 2051319-8, filed Nov. 12, 2020, the disclosure of which is incorporated herein by reference in its entirety.

TECHNICAL FIELD

The present disclosure relates generally to training of machine learning-based models and, in particular, to such training for feature detection in images of animals.

BACKGROUND ART

Image-based positioning systems that operate on image data from digital cameras are used in many commercial applications and are capable of achieving high accuracy at reasonable cost. During operation, image-based positioning systems perform a detection step for detecting objects and keypoints on the objects in individual video streams, an association step for associating the detected objects/keypoints in different video streams with each other, and a positioning step for calculating 3D positions in a global coordinate system based on the locations of associated keypoints in the different video streams, and possibly based on temporal information.

The performance of the positioning system is highly dependent on the detection of the keypoints, which are predefined feature points on the objects, for example joints or extremities. Machine learning-based models may be used for the detection of keypoints and need to be trained on a large set of so-called annotated or labeled images, for which the locations of the keypoints are known and in which animals or animal parts are depicted against realistic backgrounds in a large number of different poses and configurations. While there are large datasets of annotated images of humans, such as the COCO dataset with more than 100,000 annotated images, the availability of annotated images of animals is limited. This shortage of training data makes it difficult to use machine learning to detect keypoints in images of animals.

To overcome this problem, US2020/0279428 proposes to synthetically render images that include a 3D model of an animal in multiple poses, with known joint locations, and against various backgrounds. A generative adversarial network (GAN) is trained by the synthetic images and real images of the animal. The trained GAN is used to translate the synthetic images into corresponding more realistic images, which are processed to generate textures of the animal. A keypoint detector is then trained by use of images of the animals rendered with the generated textures and associated known joint locations. This prior art approach is highly complex and requires a 3D model of each animal category to be detected.

BRIEF SUMMARY

It is an objective to at least partly overcome one or more limitations of the prior art.

Another objective is to provide an alternative technique of generating training data for use in training a machine learning-based model to detect feature points in images of animals.

A further objective is to provide a simple and processing-efficient technique of expanding available training data, which comprises images of animals and annotation data comprising location data for predefined feature points on the animals in the images.

Yet another objective is to generate a trained machine-learning model capable of detecting feature points in images of animals.

One or more of these objectives, as well as further objectives that may appear from the description below, are at least partly achieved by a method of processing images of animals, a computer-readable medium, and a device for processing images of animals according to the independent claims, embodiments thereof being defined by the dependent claims.

Still other objectives, as well as features, aspects and technical effects will appear from the following detailed description, from the attached claims as well as from the drawings.

BRIEF DESCRIPTION OF DRAWINGS

Embodiments will now be described in more detail with reference to the accompanying schematic drawings.

FIG. 5A-5B are flow charts of example procedures for use in the method of FIG. 3.

DETAILED DESCRIPTION OF EXAMPLE EMBODIMENTS

Figure 1:
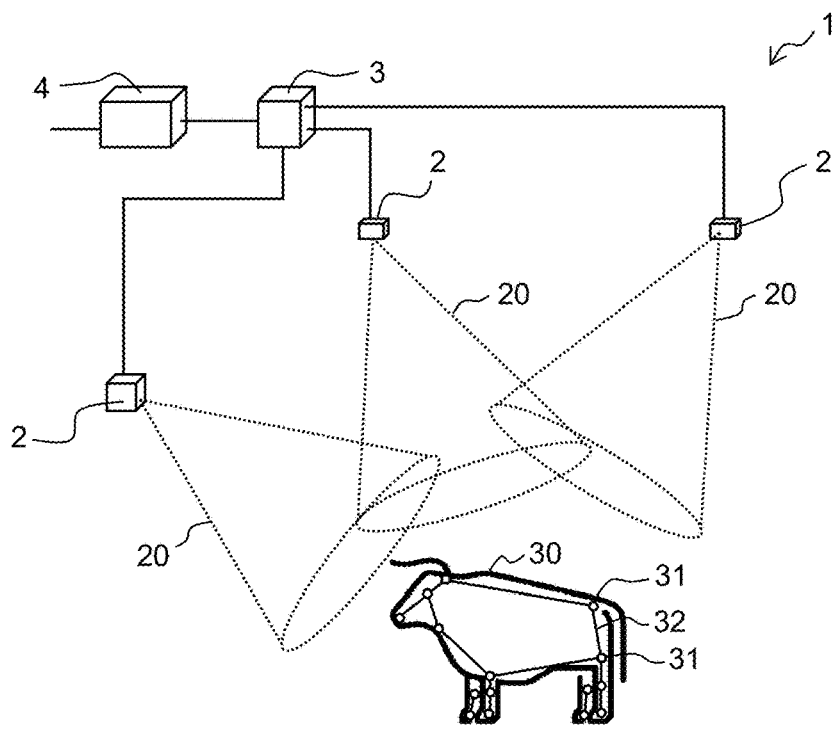
FIG. 1 is a perspective view of an example installation of a monitoring system configured to perform image-based positioning.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

As used herein, the terms "multiple", "plural" and "plurality" are intended to imply provision of two or more elements. The term "and/or" includes any and all combinations of one or more of the associated elements.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like reference signs refer to like elements throughout.

Before describing embodiments in more detail, a few definitions will be given.

As used herein, "imaging device" is a device configured to generate images of a scene by detection of electromagnetic waves and/or mechanical waves that are generated and/or reflected by the scene and objects therein. The imaging device may be responsive to electromagnetic waves in any wavelength range, including but not limited to ultraviolet, visible, or infrared radiation, or any part or combination thereof. The imaging device may be configured to produce still images or a digital video stream, i.e. a coherent time-sequence of images. The respective image is a two-dimensional (2D) representation of the scene, or part thereof, as seen by the imaging device.

As used herein, "scene point" is any three-dimensional (3D) point in a scene that is included and detectable in images by an imaging device.

As used herein, "image point" is a two-dimensional representation of the scene point in an image. The image point may also be denoted "feature point" or "interest point". In the following, the image point is denoted keypoint. The term keypoint is commonly used in the field of computer vision, where it refers to a spatial location or point in an image that defines what is interesting or what stand out in the image and may be defined to be invariant to image rotation, shrinkage, translation, distortion, etc. More generally, a keypoint is a reference point on an object to be detected in the image, with the reference point having a predefined placement on the object. Keypoints may be defined for a specific type of object, for example an animal body, or a part of the animal body. In the example of an animal body, keypoints may identify one or more joints and/or extremities and/or other features such as eyes, ears, nose, etc.

As used herein, "animal category" includes a group of animals having shared characteristics, for example a level of taxonomy or taxonomic rank. In other words, different animal categories may be separated by taxonomic rank. One taxonomic rank is "family" which, for example, includes Felidae (including cats), Canidae (including dogs), Ursidae (including bears), Mustelidae (including weasels), Bovidae (including cattle, sheep, goats), etc. Other examples of taxonomic ranks include subfamily, tribe, subtribe, genus, species, and subspecies. For example, wild and domestic cattle are included in the genus *Bos*, domestic cattle is included in the species *Bos taurus*. In a further example, all domestic cats are included in the species *Felis catus*. In yet another example, both sheep and goats are included in the subfamily Caprinae but belong to different genus: *Ovis* and *Capra*.

FIG. 1 shows an example arrangement of a monitoring system 1, that is arranged to monitor a scene including one or more animals 30, in this example cattle (cow/bull). The system 1 comprises a plurality of imaging devices 2, for example digital cameras, which are oriented with their respective field of view 20 towards the scene. The scene is associated with a fixed 3D coordinate system 10' ("global coordinate system"). The imaging devices 2 may be fixed or moveable, and their relative positions and orientations are known for each image taken. The imaging devices 2 are oriented with overlapping fields of view 20 and thus produce at least partly overlapping images of the scene. The imaging devices 2 may be synchronized to capture a respective image at approximately the same time, or at least with a maximum time difference which depends on the expected maximum speed of movement of the one or more animals 30.

The images captured by the imaging devices 2 are received by a detection device 3, which is configured to determine one or more keypoints 31 on the animal(s) 30 in the respective image. In the illustrated example, the keypoints 31 are shown as open dots, which are connected by lines 32 to define a skeleton structure. In the context of the present disclosure, the keypoints and the resulting skeleton structure for an animal in an image represent a "2D pose" or "2D posture".

In an alternative configuration, the monitoring system 1 comprises a plurality of detection devices 3, for example one for each imaging device 2, where the detection devices 3 may be co-located or integrated with the imaging devices 2. The detection device 3 produces location data, which identifies the keypoint(s) 31 on the animal(s) 30 in the respective image, and the location of the respective keypoint in the respective image.

The system 1 further comprises a positioning device 4, that is configured to operate on the location data to compute, and possibly track over time, one or more 3D positions in the global coordinate system 10' for the animal(s) 30 in the scene. The 3D positions define a "3D pose" or "3D posture" of the respective animal 30. The positioning device 4 may calculate the 3D position(s) by triangulation. Generally, computation of 3D positions requires locations of keypoints in images to be determined with high accuracy.

The detection of keypoints 31 in images from the imaging devices 2 may be performed by use of a machine learning-based model, abbreviated MLM in the following. An MLM, also known as a machine learning algorithm, is a mathematical algorithm which, when implemented on a computer resource, has the ability to automatically learn and improve from experience without being explicitly programmed. The present disclosure relates to so-called supervised or semi-supervised learning algorithms, which are configured to build a mathematical model on training data. The resulting mathematical model is thus "trained" and is denoted trained MLM in the following. The training data comprises a set of training examples. Each training example has one or more inputs and the desired output. The outputs may be represented by an array or vector, sometimes called a feature vector, and the inputs may be represented by one or more matrices. Through iterative optimization, learning algorithms learn a function that can be used to predict the output associated with new inputs. The MLM may be based on any suitable architecture, including but not limited to convolution neural networks (CNNs). Examples of commercially available MLMs that may be adapted and used within the context of the present disclosure include OpenPose and High Resolution Net, which are described in the articles "OpenPose: Realtime Multi-Person 2D Pose Estimation using Part Affinity Fields" by Cao et al, arXiv:1812.08008v2 (2019), and "Deep High-Resolution Representation Learning for Human Pose Estimation", by Sun et al, arXiv:1902.09212v1 (2019), which are both incorporated herein by reference.

Embodiments relate to techniques for generating training data for MLM-based keypoint detection in images of animals. As noted in the Background section, in this technical field, the training of MLMs is hampered by limited access to appropriate training data. Such training data includes sample images of the animal category (or categories) for which keypoints are to be detected and corresponding annotation data. The annotation data corresponds to the above-mentioned feature vector and may identify, for the respective sample image, the location of each detected keypoint on each animal in the sample image. The location may be given by coordinates in a local and fixed coordinate system of the image. It should be understood that the keypoints are predefined for the animal category so that each keypoint corresponds to a specific joint, extremity, or other feature of the animal category. Examples of such keypoints are shown in FIG. 1. If a keypoint is not visible or cannot be accurately inferred based on general knowledge of the body structure of the animal, this may be indicated in the annotation data. In the following description, a distinction is made between "original images", "sample images" and "input images". Original images refer to images that may be in any format and include any number of animals and that are associated with annotation data for all keypoints in the respective original image. The original images are thus "annotated" or "labeled" by the annotation data. Sample images have a predefined format and typically are prepared to include a single animal, although further animals may partly be visible depending on viewing angle and arrangement of animals in the scene. The sample images are associated with annotation data for the included animal(s), and are thus "annotated" or "labeled", and are adapted for training of an MLM. As will be described further below, sample images may be at least partly prepared as, or based on, cut-out portions of original images. Each cut-out portion may be represented as a corresponding subset of the actual signal values in the original image. Alternatively, the cut-out portion may be represented as a reference to the original image and a bounding box that defines the location and extent of the cut-out portion in the original image. The cut-out portion is also denoted "animal instance" herein. The input images are not associated with annotation data and are thus "unannotated" or "unlabeled". The input images are adapted to be processed by a trained MLM and have the same predefined format as the sample images. Further, the animal content in the input images corresponds to the animal content of the sample images. For example, if the sample images are prepared to include a single animal, so are the input images.

Figure 2A:
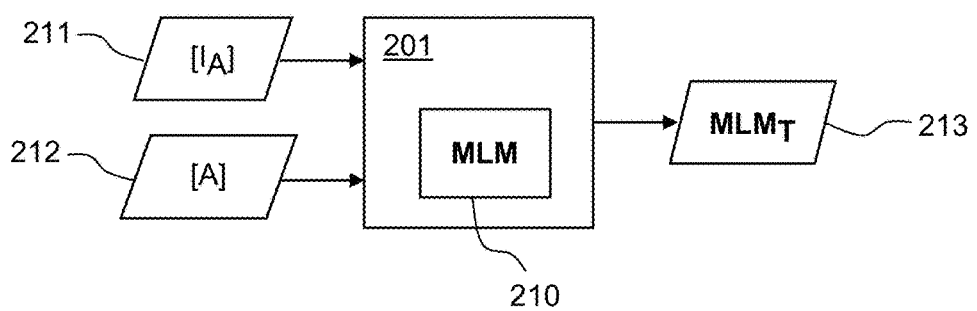
FIG. 2A shows an example of training of a machine learning-based model.

An example training of an MLM 210 is schematically illustrated in FIG. 2A. The MLM 210 is installed in a training device 201, which may be or comprise any type of computer resource. Training data is supplied to the training device 201 and comprises a set of sample images 211 and corresponding annotation data 212. In FIG. 2A, the sample images are collectively designated by $[I_A]$, with $I_A$ designating the respective sample image. It may be noted that the annotation data may take different forms depending on implementation. In one example, the annotation data comprises a list of coordinates for the keypoints in the respective sample image. In another example, the annotation data comprises "heatmaps", which represent the probability of a keypoint in each location of the sample image. For example, the annotation data may comprise one heatmap for each keypoint in the respective sample image. In FIG. 2A, annotation data for a set of sample images are designated by [A], with A designating the annotation data for the respective sample image. The training device 201 is operated on the training data to train the MLM 210 and outputs a trained MLM 213, designated by $MLM_T$.

Figure 2B:
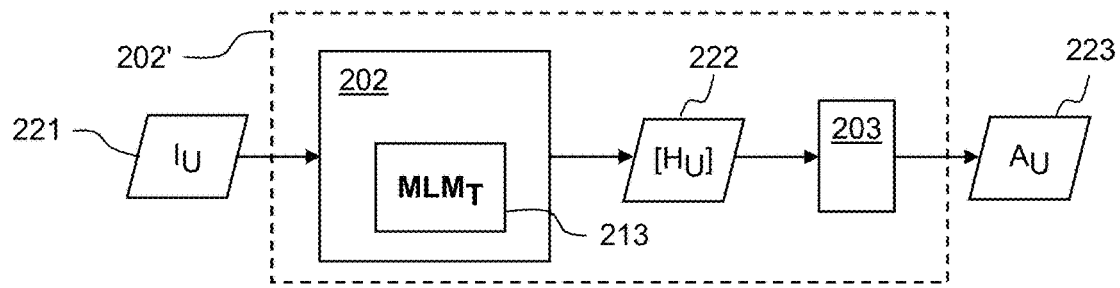
FIG. 2B shows an example of using a trained machine learning-based model.

FIG. 2B shows an example installation of the trained $MLM_T$ 213 in a system for determination of 2D poses of animals in input images, for example in the system 1 of FIG. 1. The installation of FIG. 2B defines a keypoint detector 202', which operates on input images 221 to generate corresponding annotation data 222, 223. As noted above, the input images 221 have an unknown content of keypoints. In FIG. 2B, an input image is designated by IU. For example, an image captured by one of the imaging devices 2 in FIG. 1 may result in one or more input images. The keypoint detector 202' comprises an image processing module 202, which is configured to operate the trained $MLM_T$ 213 on the input image 221. The image processing module 202 may be or comprise any type of computer resource. In the illustrated example, the trained $MLM_T$ 213 is configured to generate a set of heatmaps 222 for the input image. In FIG. 2B, the heatmaps are collectively designated by $[H_U]$, with $H_U$ designating the respective heatmap. A post-processing module 203 is arranged to receive and process the heatmaps 222 to generate a coordinate list 223, designated $A_U$, for the input image $I_U$. It may be noted that the heatmaps 222 and the post-processing module 203 may be omitted if the trained MLM is configured to generate the coordinate list AU by being trained on training data comprising coordinate lists, as exemplified in FIG. 2A. The coordinate list $A_U$ defines a 2D pose of each animal included in the input image $I_U$.

Embodiments are based on the idea of producing further training data for one or more animal categories by use of an MLM which has been trained on available training data that represents the one or more animal categories, specifically by operating the thus-trained MLM on unannotated images of animals belonging to the one or more animal categories. Such unannotated images may be generated without effort, for example by use of one or more imaging devices (cf. 2 in FIG. 1). Although the thus-trained MLM might not be capable of generating annotation data of sufficient quality for use in determining 3D poses, the annotation data that is generated for the unannotated images may instead be included in the training data together with the unannotated images. Thus, the idea enables the available training data to be effortlessly expanded. The expanded training data may then be used for training an MLM to generate annotation data of sufficient quality for 3D pose determination, or any other purpose that requires highly accurate keypoint or 2D pose detection in images.

Figure 3:
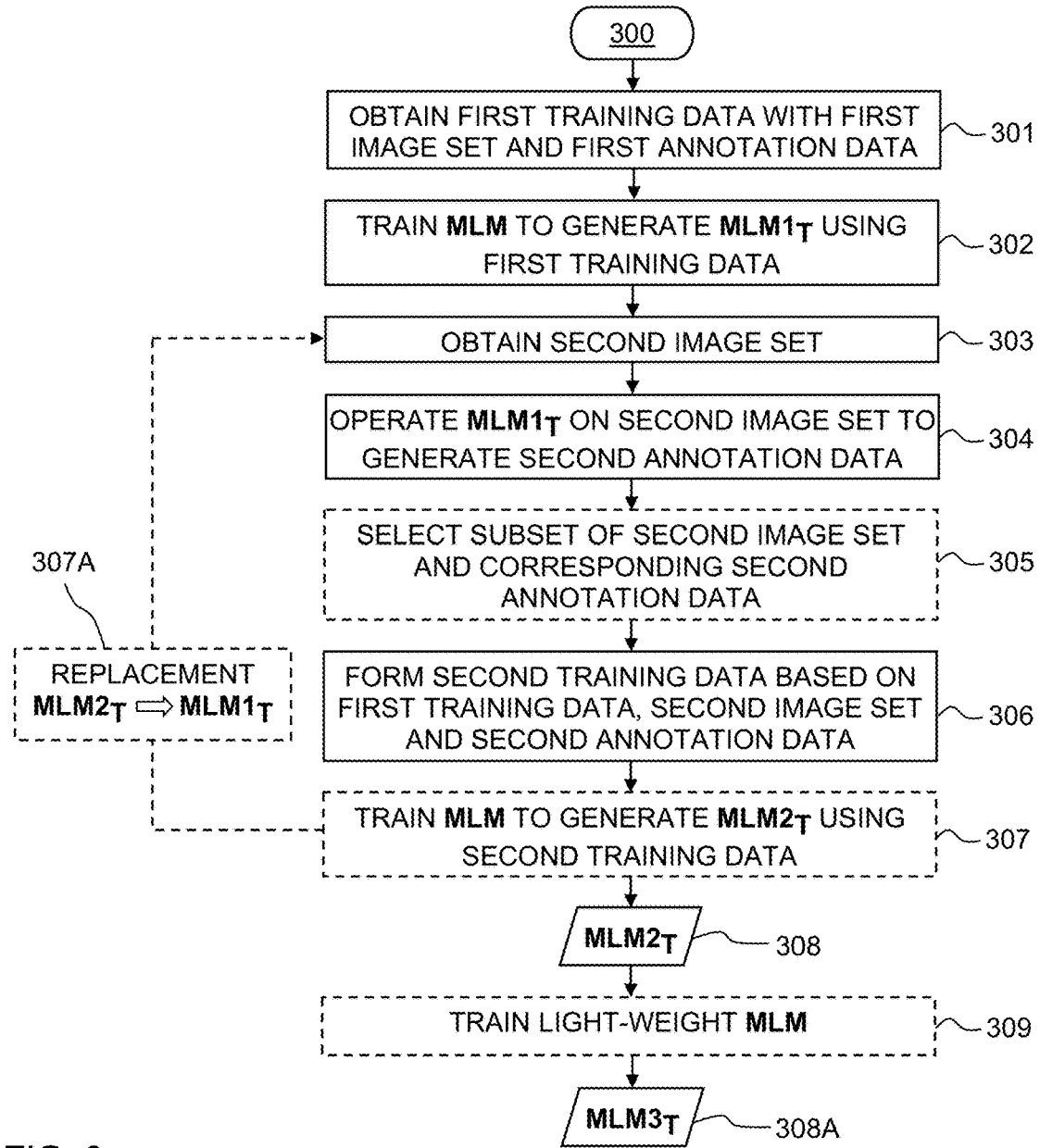
FIG. 3 is a flow chart of an example method of processing images of animals.

An embodiment that is based on this idea is shown in FIG. 3, which is a flow chart of an example method 300 for expanding an available set of training data, denoted "first training data", into an expanded set of training data, denoted "second training data", and optionally generating a trained MLM based on the second training data. In FIG. 3, optional steps are indicated by dashed lines and will be described further below. The method 300 may be implemented on any type of computer resource and comprises a step 301 of obtaining first training data, which comprises a first set of sample images of animals ("first image set") and first annotation data, which comprises location data for predefined keypoints on animal(s) in each sample image in the first image set. The first training data may correspond to the data 211, 212 in FIG. 2A. The first training data may be pre-generated and stored in a memory device. Alternatively, as described in more detail below, the first training data may be generated by step 301 based on a dataset of the above-mentioned original images and associated annotation data stored in the memory device. The memory device may be located in or be communicatively connected, by wire or wirelessly, to the computer resource that performs the method 300.

Figure 4A:
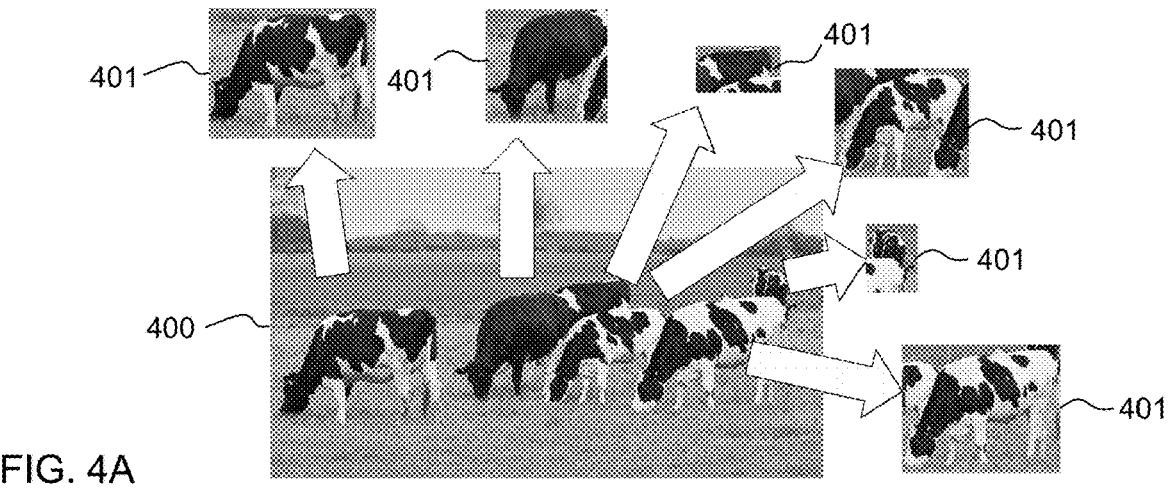
FIG. 4A illustrates example pre-processing for separating an original image into cut-out image portions, and FIG. 4B includes example images of animals with indicated keypoints.

In some embodiments, step 301 generates the first training data by a pre-processing operation that extracts a cut-out image portion ("animal instance") that includes at least one animal in the original image, includes the animal instance (optionally after further pre-processing) as a sample image in the first image set, and includes location data for the keypoints in the animal instance in the first annotation data. This pre-processing operation is illustrated in FIG. 4A, which depicts an original image 400 of a group of cows, where the pre-processing separates the original image 400 into animal instances 401, each approximately centered on a respective cow. Step 301 may include one or more of the animal instances 401 in the first image set.

In some embodiments, step 301 applies conventional data augmentation when generating at least part of the first training data. Data augmentation is used to increase the amount of data by adding slightly modified copies of already existing data or newly created synthetic data from existing data. Data augmentation acts as a regularizer and helps reduce overfitting when training an MLM. Such data augmentation includes geometric transformations, flipping, color modification, cropping, rotation, noise injection, blurring, random erasing, etc.

It may be noted that step 301 may but need not be completed before the method 300 proceeds to the training step 302 (below). In some embodiments, step 301 continually generates sample images and corresponding annotation data for use by the training step 302, which may process the sample images sequentially or in small batches as they arrive. In other words, the first training data may be generated in bulk or sequentially ("on-the-fly"). Compared to bulk generation, sequential generation of training data is more time efficient, requires less storage capacity, and is capable of generating training data of higher variety. For example, sequential generation makes it possible to gradually modify the data augmentation, for example by gradually increasing the amount of data augmentation as the training by step 302 progresses.

Additional examples of step 301 are presented further below with reference to FIG. 5B.

Step 302 trains a first MLM by use of the first training data to generate a first trained MLM, designated as $MLM1_T$ in FIG. 3. The training in step 302 may be performed by analogy with the training of the MLM 210 in FIG. 2A.

Step 303 obtains a second set of images of animals ("second image set"), which typically is not associated with annotation data and is thus "unannotated" (cf. 221 in FIG. 2B). The images in the second image set are thus "input images" as defined above. Step 303 may obtain the second image set from a memory device or from one or more imaging devices. Step 303 may generate at least part of the second image set by processing images with an unknown content of animals. For example, step 303 may operate a conventional animal detector on these images, extract cut-out image portions of one or more animals in the respective image, and include the cut-out image portions as input images in the second image set.

Step 304 operates the first trained MLM ($MLM1_T$) on the second image set to generate second annotation data comprising location data for the predefined keypoints on at least one animal in each input image in the second image set. Step 304 may be performed by analogy with the operation of the trained $MLM_T$ 213 on the input image 221 to generate annotation data comprising the heatmaps 222, and/or the coordinate list 223 in FIG. 2B.

Step 306 aggregates at least a subset of the first and second image sets, and a corresponding portion of the first and second annotation data, into second training data. The term "subset" refers to entire images. Thus, a subset is one or more images in the first and second image sets. Step 306 may thus generate the second training data by including input images from the second image set and, optionally, sample images from the first image set, and by including corresponding location data for the keypoints of the thus-included images. As understood from the foregoing, the first and second annotation data may comprise a list of coordinates for the keypoints and/or heatmaps for the keypoints in the respective image. The second training data is thereby expanded in relation to the first training data in terms of the included number of annotated images. Step 306 may also apply pre-processing and/or data augmentation when generating the second training data, by analogy with step 301.

The method 300 may include a step 307 of training an MLM, by use of the second training data, to generate a second trained MLM 308, designated as $MLM2_T$ in FIG. 3. The training in step 307 may, like the training in step 302, be performed on second training data generated in bulk or sequentially by step 306. The MLM that is trained in step 307 may be the same as in step 302, i.e. the first MLM. However, it is also conceivable that step 307 trains a different MLM, which may be denoted "second MLM". The second MLM may, for example, differ from the first MLM by connections between layers and/or included layers.

The method 300 may include a step 309 of generating a third trained MLM 308A, designated as $MLM3_T$ in FIG. 3, by training a third MLM on at least part of the second training data (from step 306) and/or on third training data generated by the second trained MLM 308 ($MLM2_T$) by analogy with steps 303-307. The third MLM, denoted "lightweight MLM" in FIG. 3, may be configured to result in a third trained MLM 308A which is more processing efficient than the second trained MLM 308 and thereby more suitable for real-time use. Further, the second trained MLM 308 may, but need not, be configured to be more accurate than the third trained MLM 308A. For example, the third trained MLM 308A may have fewer layers, less connections, different architecture, etc., and/or use lower input resolution than the second trained MLM 308. It is realized that step 309 may improve the real-time performance of an image processing module that comprises and operates a trained MLM for keypoint detection, for example the image processing device 202 in FIG. 2B.

The method 300 may include a step 305 of actively selecting, among images in the second image set, images to be included in the second training data by step 306. By such active selection of images, the quality of the second training data may be improved. It should be noted that the images in the second image set may be animal instances which, as explained above, are defined by a reference to a bounding box in an original image and which are associated with annotation data for the keypoints within the bounding box. Irrespective of the type of images included in the second image set, the selection by step 305 is at least partly based on the annotation data that has been generated by the first MLM (step 304) for the respective image in the second image set.

An example procedure corresponding to step 305 is shown in FIG. 5A. In the following, it is assumed that the images in the second image set are animal instances that each depicts an individual animal. The procedure comprises a step 501 of generating, based on the second annotation data from step 304, a score for each animal instance in the second image set from step 303. In some embodiments, the score may be given by prediction scores (also known as "confidence scores") that are generated for each keypoint by the first trained MLM (MLM1$_T$) in step 304, or by a post-processing module (cf. 203 in FIG. 2B). Such a prediction score may represent a level of certainty for the respective detection of the keypoint and/or its location. In one example, the score for an animal instance may be given as an aggregation, for example mean or median, of the prediction scores for the keypoints associated with the included animal. In another example, the score may be a count of the number of keypoints that have a prediction score that exceeds a score threshold. In some embodiments, the score may instead or additionally be given by an analysis of the locations for the keypoints associated with the included animal. In one example, the score may represent the probability that the 2D pose ("skeleton") formed by the ensemble of keypoints matches a 2D pose of a real animal. Step 305 further comprises a step 502 of determining, as a function of the score and among the animal instances in the second image set, the animal instances to be included in the second training data. In some embodiments, step 502 may evaluate the score in relation to a predefined criterion and select the animal instances in the second image set that fulfil the predefined criterion, for example those having a high enough score. The procedure in FIG. 5A may also be applied to select, among the images in the first image set, images to be included in the second training data by step 306.

It is to be understood that step 305 is optional. In an alternative, step 306 may include all images in the first/second image set in the second training data. In another alternative, step 306 may randomly include images from the first/second image set in the second training data.

It has surprisingly been found that more than one animal category may be included in the first training data in the method 300 in FIG. 3 without reducing the performance of second trained MLM 308. It has been found that by training the MLM to detect keypoints for a larger number of animal categories, the MLM is encouraged to rely on more generalizable features which leads to increased versatility of the second trained MLM 308. To achieve this advantage, the animal categories should have a corresponding skeletal structure. For example, the first training data may include sample images of different quadrupeds, such as four-legged animals. Example sample images 401, 402, 403 of four-legged mammals 30 with keypoints 31 and connecting lines representing the skeleton structure is shown in FIG. 4B. Sample image 401 depicts a cow/bull, sample image 402 depicts a goat/sheep, and sample image 403 depicts a dog. As seen, the skeleton structure represented by the connected keypoints 31 is quite similar between the animals in sample images 401-403. It has also been found that improved performance is achieved if the second image set (step 303) is restricted to one or more of the animal categories that are included in the first training set.

Reverting to FIG. 3, it is seen that the method 300 may iterate through steps 303-307, which may serve to further improve the quality of the second training data and the second trained MLM 308. As seen, the method 300 comprises a step 307A which replaces, between each iteration, the first trained MLM (MLM1$_T$) in step 304 for the second trained MLM (MLM2$_T$) from step 307. In other words, after the first execution of steps 303-307, step 304 operates the second trained MLM from the latest execution of step 307 on the second image set to generate the second annotation data. The second image set obtained by step 303 may be the same or differ between iterations. The underlying rationale for the iterations is that the second trained MLM generated by step 307 is likely to be gradually improved, in terms of its ability to generate high quality predictions for more images in the second image set. The number of iterations to be performed may be predefined. Alternatively, the iteration through steps 303-307 may be terminated when an accuracy criterion is fulfilled, for example given by a difference between the second annotation data generated by step 304 in consecutive iterations.

Although not shown in FIG. 3, the method 300 may further comprise post-solution activity such as storing the second training data generated by step 306 in a memory device, storing the second or third trained MLM 308, 308A in a memory device, or transmitting the second or third trained MLM 308, 308A for use in a keypoint detector (cf. 202' in FIG. 2B). Another post-solution activity comprises operating the second or third trained MLM 308, 308A on an input image to determine locations of the predefined keypoints on animal(s) in the input image. The latter post-solution activity may be implemented by installing the second or third trained MLM 308, 308A as the trained MLM 213 in the system of FIG. 2B.

Figure 7A:
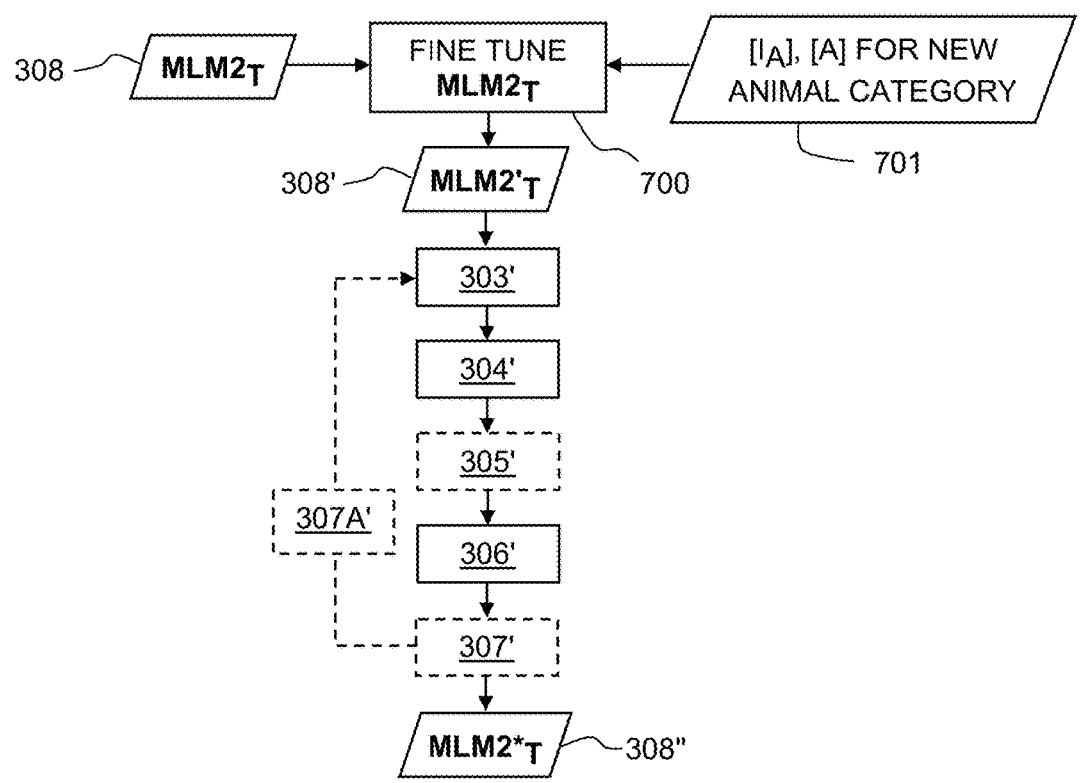
FIG. 7A is a flow chart of an example method for modifying a trained machine learning-based model for operation on a new animal category.

Another type of post-solution activity is depicted in FIG. 7A. Here, it assumed that the second trained MLM 308 has been generated for one or more animal categories, for example, by the method 300 in FIG. 3. The example method in FIG. 7A provides an efficient technique of generating training data that includes a further animal category, known as "transfer learning" in the art. For example, the second trained MLM 308 may be generated by use of images of cattle and goats/sheep (cf. 401, 402 in FIG. 4B). Such a second trained MLM 308 may have inferior performance on input images of cats. The example method in FIG. 7A assumes availability of third training data 701 that represents animals 30 of a further animal category, for example cats. The third training data 701 comprises, in this example, sample images of cats ($(I_A)$) and location data ($[A]$) for keypoints on the cats in the sample images.

The method in FIG. 7A comprises a fine tuning step 700, which obtains the third training data 701 and the second trained MLM 308, and refines the second trained MLM 308 based on the third training data 701 to generate a refined second trained MLM 308', designated as MLM2'$_T$ in FIG. 7A. Step 700 may comprise conventional fine tuning. As understood by the skilled person, fine tuning is a process of taking values of learnable parameters of a trained MLM and using them as initialization values for re-training of the MLM on new data. During the re-training, some of the learnable parameters from the trained MLM may be fixed ("frozen").

Figure 7B:
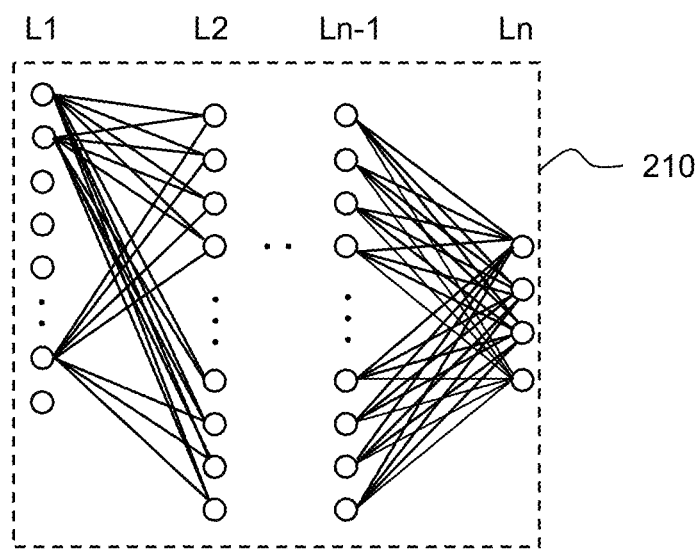
FIG. 7B is an illustration of an example machine learning-based model.

To give further context, FIG. 7B shows a generic example of an MLM 210, which comprises nodes or neurons (open circles) arranged in a plurality of layers L1, L2, . . . , Ln−1, Ln, with L1 being an input layer and Ln being an output layer. Connections between nodes in different layers are indicated by solid lines. Each node is associated with learnable parameters, typically a "weight" and a "bias". When inputs are transmitted between nodes, along the connections, the learnable parameters are applied to the inputs. During training, the learnable parameters are adjusted from their initial values, unless some of them are frozen.

Reverting to FIG. 7A, step 700 may comprise defining an intermediate MLM to comprise the same arrangement of nodes in layers and connections between nodes as the second MLM, and assigning a subset of the learnable parameter values of the second MLM to corresponding nodes in the intermediate MLM. Step 700 may then train the intermediate MLM based on the third training data 701, without changing the subset of the learnable parameter values, to generate the refined second trained MLM 308' (MLM2'$_T$). For example, all or a subset of the weights for one or more layers of the intermediate MLM may be frozen, for example the output layer (cf. Ln in FIG. 7B).

The refined second trained MLM 308' may then be processed by a procedure comprising steps similar to steps in the method of FIG. 3. Correspondence to steps in FIG. 3 are indicated by a prime symbol (') in FIG. 7A. Hence, step 303' corresponds to step 303, etc. Step 303' obtains a fourth image set with unannotated images of animals ("input images") belonging to the further animal category (cats, in the current example). Step 304' operates the refined second trained MLM 308' on the fourth image set to generate fourth annotation data, by analogy with the second annotation data generated by step 304. Thus, the fourth annotation data comprises location data for predefined keypoints on at least one animal in each input image in the fourth image set. Optional step 305' may select images from the fourth image set and corresponding annotation data from the fourth annotation data, by analogy with step 305. Step 306' aggregates, by analogy with step 306, at least a subset of the third and fourth image sets, and a corresponding subset of the third and fourth annotation data, into fourth training data. Optionally, by analogy with step 307, step 307' may generate an updated second trained MLM 308'', designated by MLM2*$_T$ in FIG. 7A, based on the fourth training data. The updated second trained MLM 308'' is thereby tailored for high-accuracy detection of keypoints in input images of cats, in addition to input images of cattle and sheep/goats. As shown, the procedure in FIG. 7A may iterate through steps 303'-307', by analogy with the iteration through steps 303-307 in FIG. 3. As seen, a step 307A' is included to replace, between each iteration, the refined trained second MLM 308' in step 304' for the updated second trained MLM from step 307'.

FIG. 5B is a flow chart of an example procedure corresponding to step 301 in FIG. 3. The procedure thus provides the first training data and comprises steps 511-514. In the illustrated example, the procedure generates a stream of sample images and associated annotation data by repeating steps 511-514.

Step 511 generates pairs of images and annotation data for processing by step 512. The image in each pair is an animal instance as described above and exemplified in FIGS. 4A-4B. In some embodiments, step 511 obtains an original image and associated annotation data from a dataset in a memory device. The annotation data includes location data for the keypoints of the respective animal in the original image, and may also define a bounding box for the respective animal in the original image. Step 511 may retrieve the respective bounding box from the annotation data or, if the annotation data does not define bounding boxes, dynamically define a bounding box of predefined format that surrounds the keypoints associated with the respective animal in the original image. Step 511 may further evaluate the location data for the respective bounding box and select bounding boxes that fulfil a selection criterion, for example by analogy with step 305 above. For each selected bounding box, step 511 generates an animal instance and associated annotation data that comprises location data for the keypoints in the animal instance. Step 511 stores the generated pairs of animal instances and annotation data in the memory device. In an alternative, step 511 is omitted if pairs of animal instances and annotation data have been pre-generated and stored in the memory device.

Step 512 performs data augmentation on a current animal instance retrieved from a batch of animal instances stored in the memory device. Any of the above-mentioned conventional methods may be used. As indicated in FIG. 5B, step 512A may comprise a "cut-mix augmentation", which has been conceived by the present Applicant and found to improve the utility of the second training data generated by step 306 (FIG. 3), for example in terms of the performance of the trained second MLM 308. The cut-mix augmentation of step 512A involves cutting a selected portion from a second animal instance, which has been randomly selected in the batch and retrieved from the memory device, and pasting the selected portion onto the current animal instance to form a cut-mix instance. In the pasting, the current animal instance is updated by adding a second bounding box corresponding to the selected portion and a reference to the original image of the second animal instance. By the pasting, the signal values in the second bounding box replace the corresponding signal values in the current animal instance. Thus, as used herein, "pasting" refers to a process of replacing or overwriting one portion with another portion. It may be noted that it is possible, due to the random selection, that the second animal instance is the same as the current animal instance. The cut-mix augmentation is exemplified in FIG. 6A, in which a selected portion 410 of animal instance 403 in FIG. 4B has been pasted onto the animal instance 401 in FIG. 4B, forming the cut-mix instance 401'.

The selected portion may be a rectangle of random size taken at a random location in the second animal instance. The location may be uniformly random or be slightly biased towards where the keypoints are located in the second animal instance. Any distribution of the size of the selected portion may be used. In some embodiments, the distribution favors small and/or large portions of the animal instances but not medium-sized portions. A non-limiting example of such a distribution is a beta distribution with appropriate shape parameters, for example $\alpha=\beta=0.1$.

Step 513 updates the annotation data associated with the current animal instance to represent the keypoints in the resulting cut-mix instance. For example, step 513 may remove keypoints that are replaced by the selected portion, and add keypoints included in the selected portion. For example, when the annotation data comprises one heatmap for each keypoint, step 513 may update each heatmap of the current animal instance by cutting and pasting from the corresponding heatmap of the second animal instance. Thereby, the selected portion in the heatmap of the current animal instance is replaced by the selected portion in the corresponding heatmap of the second animal instance. FIG.

Figures 6A, 6B:
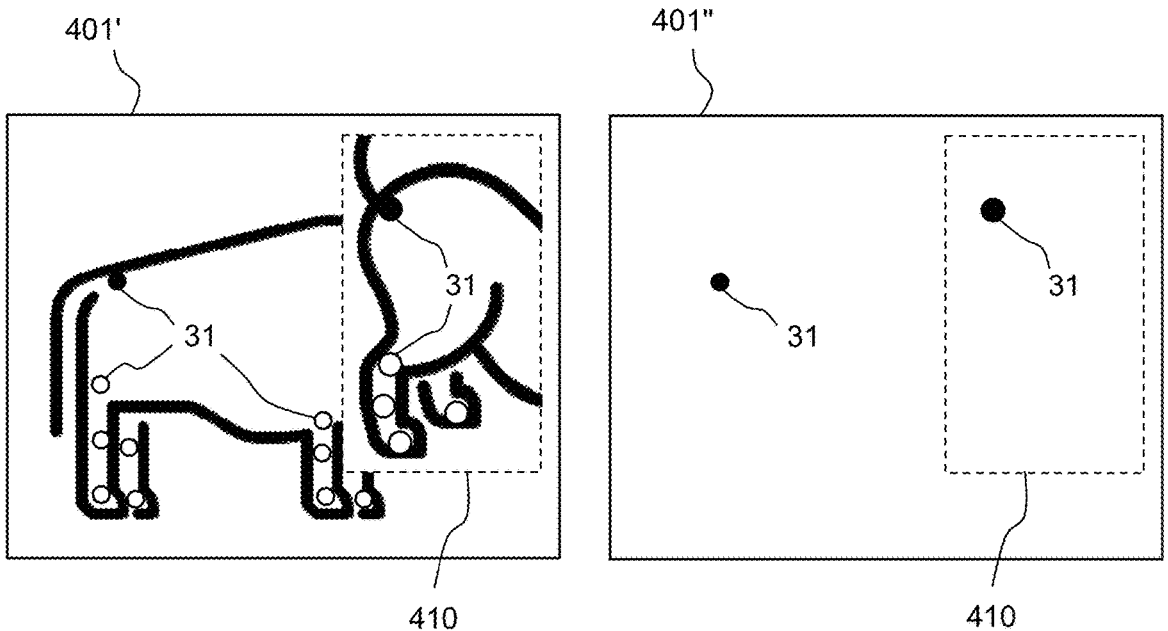
FIG. 6A is an example of an augmented image generated by the procedure in FIG. 5B.
FIG. 6B is an example of a corresponding heatmap.

6B shows an updated heatmap 401″ that corresponds to the cut-mix instance 401′ in FIG. 6A and represents the keypoint of the hip joint (filled circles in FIG. 6A). As indicated by a dashed rectangle, the selected portion 410 of the corresponding heatmap for the hip joint of the animal instance 403 has been pasted into the heatmap for the hip joint of the animal instance 401.

Step 514 provides the cut-mix instance and the updated annotation data as part of the first training data to step 302 (FIG. 3).

It may be noted that the cut-mix augmentation of step 512A need not be performed on every current animal instance but may be performed deterministically or randomly on the current animal instances retrieved by step 512.

It is also conceivable to first perform the method 300 without the cut-mix augmentation of step 512A (in step 301), evaluate the quality of the second training data and/or the second trained MLM 308 and, if the quality is insufficient, perform the method 300 with the cut-mix augmentation of step 512A (in step 301).

Figure 8:
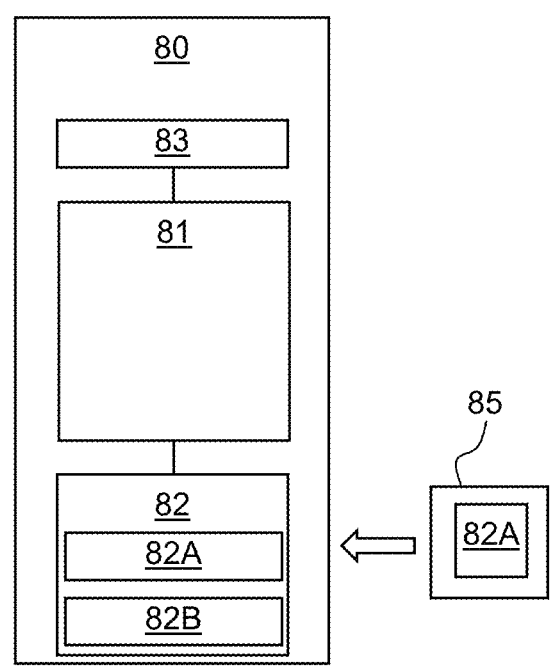
FIG. 8 is a block diagram of a machine that may implement any method described herein.

The structures and methods disclosed herein may be implemented by hardware or a combination of software and hardware. In some embodiments, such hardware comprises one or more software-controlled computer resources. FIG. 8 schematically depicts such a computer resource 80, which comprises a processing system 81, computer memory 82, and a communication interface 83 for input and/or output of data. The communication interface 83 may be configured for wired and/or wireless communication, for example with the imaging devices 2 (FIG. 1) or a data storage. The processing system 81 may, for example, include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 82A comprising computer instructions is stored in the memory 82 and executed by the processing system 81 to perform any of the methods, procedures, functions, or steps described in the foregoing. As indicated in FIG. 8, the memory 82 may also store control data 82B for use by the processing system 82, for example the machine learning-based model(s) to be trained, the dataset, the first image set, the first annotation data, etc. The control program 82A may be supplied to the computer resource 80 on a computer-readable medium 85, which may be a tangible (non-transitory) product (e.g. magnetic medium, optical disk, read-only memory, flash memory, etc.) or a propagating signal.

The techniques disclosed and described herein have a variety of applications. In one generic application, a machine-learning based model trained as described herein may be used by a positioning system, which is configured to estimate and track the 3D pose of one or more animals in a scene. Non-limiting example of specific application include monitoring movement of animals, detecting interaction between animals, detecting health issues among animals based on their movement pattern, etc.

In the following, a set of items are recited to summarize some aspects and embodiments of the invention as disclosed in the foregoing.

Item 1. A computer-implemented method for processing images of animals (30), said method comprising:
 obtaining (301) first training data, which comprises a first set of images of animals (30) and first annotation data comprising first location data for predefined feature points (31) on at least one animal (30) in each image in the first set of images;
 training (302) a first machine learning-based model by use of the first training data to generate a first trained machine learning-based model ($MLM1_T$);
 obtaining (303) a second set of images of animals (30);
 operating (304) the first trained machine learning-based model ($MLM1_T$) on the second set of images to generate second annotation data comprising second location data for the predefined feature points (31) on at least one animal (30) in each image in the second set of images; and
 aggregating (306) at least a subset of the first and second sets of images, and a corresponding subset of the first and second annotation data, into second training data.

Item 2. The method of item 1, further comprising: generating (501), based on the second annotation data, a score for said at least one animal (30) in each image in the second set of images; and determining (502), as a function of the score, said at least a subset of the first and second sets of images.

Item 3. The method of item 2, wherein said determining (502) said subset comprises: including, in the subset, a respective image in the second set that has a score fulfilling a predefined criterion.

Item 4. The method of item 2 or 3, wherein the score is generated as a function of prediction scores output by the first trained machine learning-based model ($MLM1_T$) for the predefined feature points (31) on said at least one animal (30) in each image in the second set of images.

Item 5. The method of any one of items 2-4, wherein the score is generated as a function of the second location data for said at least one animal (30) in each image in the second set of images.

Item 6. The method of any preceding item, further comprising: generating (307) a second trained machine learning-based model ($MLM2_T$) based on the second training data.

Item 7. The method of item 6, wherein said generating (307) the second trained machine learning-based model ($MLM2_T$) comprises: training the first machine learning-based model, or a second machine learning-based model, on the second training data.

Item 8. The method of item 6 or 7, further comprising performing at least one further iteration of said obtaining (303) a second set of images, said operating (304) the first trained machine learning-based model on the second set of images, with the first trained machine-learning based model ($MLM1_T$) being replaced (307A) by the second trained machine learning-based model ($MLM2_T$), said aggregating (306) at least a subset of the first and second sets of images, and said generating (307) a second trained machine learning-based model ($MLM2_T$).

Item 9. The method of any one of items 6-8, wherein the animals (30) in the first set of images represent at least one animal category, said method further comprising: obtaining third training data (701) that represents animals (30) of a further animal category which is different from the at least one animal category, the third training data comprising a third set of images and third annotation data; refining (700) the second trained machine learning-based model ($MLM2_T$) based on the third training data (701) to generate a refined second trained machine learning-based model ($MLM2'_T$); obtaining (303′) a fourth set of images of animals (30) included in the further animal category; operating (304′) the refined second trained machine learning-based model ($MLM2'_T$) on the fourth set of images to generate fourth annotation data comprising fourth location data for the predefined feature points (31) on at least one animal (30) in each image in the fourth set of images; and aggregating (306') at least a subset of the third and fourth sets of images, and a corresponding subset of the third and fourth annotation data, into fourth training data.

Item 10. The method of item 9, wherein the second trained machine learning-based model ($MLM2_T$) comprises learnable parameter values for nodes arranged in a plurality of layers (L1, ..., LN), wherein said refining (700) comprises: defining an intermediate machine learning-based model to comprise the nodes arranged in the plurality of layers (L1, ..., LN), assigning a subset of the learnable parameter values to corresponding nodes in the intermediate machine learning-based model, and training the intermediate machine learning-based model based on the third training data (701), without changing the subset of the learnable parameter values, to generate the refined second trained machine learning-based model ($MLM2'_T$).

Item 11. The method of item 9 or 10, further comprising: generating (307') an updated second trained machine learning-based model ($MLM2^*_T$) based on the fourth training data.

Item 12. The method of any one of items 9-11, wherein the animals (30) in the second set of images belong to the at least one animal category.

Item 13. The method of any preceding item, further comprising: generating (309) a third trained machine learning-based model ($MLM3_T$) by training a third machine learning-based model on at least part of the second training data and/or on third training data generated by the second trained machine learning-based model ($MLM2_T$), wherein the third trained machine learning-based model ($MLM3_T$) is more processing efficient than the second trained machine learning-based model ($MLM2_T$).

Item 14. The method of any one of items 6-13, further comprising one or more of: storing the second trained machine-learning model ($MLM2_T$); transmitting the second trained machine-learning model ($MLM2_T$); or operating the second trained machine learning-based model ($MLM2_T$) on a current set of images of animals to determine current location data for the predefined feature points on the animals in the current set of images, and estimating a 3D pose (224) of at least one of the animals in the current set of images based on the current location data.

Item 15. The method of any preceding item, wherein said obtaining (301) first training data comprises: obtaining (512A) an image and annotation data for the image; extracting (512A) a portion (410) of another image; preparing (512A) an augmented image (401') by pasting said portion (410) onto the image; updating (513) the annotation data to represent the augmented image (401'); and providing (514) the augmented image and the thus-updated annotation data as part of the first training data.

Item 16. The method of any preceding item, wherein the second training data comprises a larger number of images than the first training data.

Item 17. A computer-readable medium comprising computer instructions which, when executed by a processing system (81), cause the processing system (81) to perform the method of any preceding items.

Item 18. A device for processing images of animals, said device being configured to perform the method of any one of items 1-17.

What is claimed is:

1. A computer-implemented method for processing images of animals, said method comprising:
    obtaining first training data, which comprises a first set of images of animals representative of a plurality of different animal categories that have a corresponding skeletal structure in common and first annotation data comprising first location data for predefined feature points that identify one or more joints and/or extremities of the skeletal structure and/or other features on at least one animal in each image in the first set of images;
    training a first machine learning-based model by use of the first training data to generate a first trained machine learning-based model;
    obtaining a second set of images of animals of at least one of the plurality of different animal categories;
    operating the first trained machine learning-based model on the second set of images to generate second annotation data comprising second location data for the predefined feature points on at least one animal in each image in the second set of images; and
    aggregating at least a subset of the first and second sets of images, and a corresponding subset of the first and second annotation data, into second training data.

2. The method of claim 1, further comprising:
    generating, based on the second annotation data, a score for said at least one animal in each image in the second set of images; and
    determining, as a function of the score, said at least a subset of the first and second sets of images.

3. The method of claim 2, wherein said determining said subset comprises:
    including, in the subset, a respective image in the second set that has a score fulfilling a predefined criterion.

4. The method of claim 2, wherein the score is generated as a function of prediction scores output by the first trained machine learning-based model for the predefined feature points on said at least one animal in each image in the second set of images.

5. The method of claim 2, wherein the score is generated as a function of the second location data for said at least one animal in each image in the second set of images.

6. The method of claim 1, further comprising:
    generating a second trained machine learning-based model based on the second training data.

7. The method of claim 6, wherein said generating the second trained machine learning-based model comprises:
    training the first machine learning-based model, or a second machine learning-based model, on the second training data.

8. The method of claim 6, further comprising performing at least one further iteration of said obtaining a second set of images, said operating the first trained machine learning-based model on the second set of images, with the first trained machine-learning based model being replaced by the second trained machine learning-based model, said aggregating at least a subset of the first and second sets of images, and said generating a second trained machine learning-based model.

9. The method of claim 6, further comprising one or more of:
    storing the second trained machine-learning model;
    transmitting the second trained machine-learning model; or
    operating the second trained machine learning-based model on a current set of images of animals to determine current location data for the predefined feature points on the animals in the current set of images, and estimating a 3D pose of at least one of the animals in the current set of images based on the current location data.

10. The method of claim 1, further comprising:
generating a third trained machine learning-based model by training a third machine learning-based model on at least part of the second training data and/or on third training data generated by the second trained machine learning-based model,
wherein the third trained machine learning-based model is more processing efficient than the second trained machine learning-based model.

11. The method of claim 1, wherein said obtaining first training data comprises:
obtaining an image and annotation data for the image;
extracting a portion of another image;
preparing an augmented image by pasting said portion onto the image;
updating the annotation data to represent the augmented image; and
providing the augmented image and the thus-updated annotation data as part of the first training data.

12. The method of claim 1, wherein the second training data comprises a larger number of images than the first training data.

13. A method for processing images, the method comprising:
obtaining first training data that comprises a first set of images of animals representative of at least one animal category and first annotation data comprising first location data for predefined feature points on at least one animal in each image in the first set of images;
training a first machine learning-based model by use of the first training data to generate a first trained machine learning-based model;
obtaining a second set of images of animals;
operating the first trained machine learning-based model on the second set of images to generate second annotation data comprising second location data for the predefined feature points on at least one animal in each image in the second set of images;
aggregating at least a subset of the first and second sets of images, and a corresponding subset of the first and second annotation data, into second training data;
generating a second trained machine learning-based model based on the second training data;
obtaining third training data that represents animals of a further animal category which is different from the at least one animal category, the third training data comprising a third set of images and third annotation data;
refining the second trained machine learning-based model based on the third training data to generate a refined second trained machine learning-based model;
obtaining a fourth set of images of animals included in the further animal category;
operating the refined second trained machine learning-based model on the fourth set of images to generate fourth annotation data comprising fourth location data for the predefined feature points on at least one animal in each image in the fourth set of images; and
aggregating at least a subset of the third and fourth sets of images, and a corresponding subset of the third and fourth annotation data, into fourth training data.

14. The method of claim 13, wherein the second trained machine learning-based model comprises learnable parameter values for nodes arranged in a plurality of layers, wherein said refining comprises:
defining an intermediate machine learning-based model to comprise the nodes arranged in the plurality of layers,
assigning a subset of the learnable parameter values to corresponding nodes in the intermediate machine learning-based model, and
training the intermediate machine learning-based model based on the third training data, without changing the subset of the learnable parameter values, to generate the refined second trained machine learning-based model.

15. The method of claim 14, further comprising:
generating an updated second trained machine learning-based model based on the fourth training data.

16. The method of claim 14, wherein the animals in the second set of images belong to the at least one animal category.

17. A non-transitory computer-readable medium comprising computer instructions which, when executed by a processing system, cause the processing system to perform a method for processing images comprising:
obtaining first training data that comprises a first set of images of animals representative of at least one animal category and first annotation data comprising first location data for predefined feature points on at least one animal in each image in the first set of images;
training a first machine learning-based model by use of the first training data to generate a first trained machine learning-based model;
obtaining a second set of images of animals;
operating the first trained machine learning-based model on the second set of images to generate second annotation data comprising second location data for the predefined feature points on at least one animal in each image in the second set of images;
aggregating at least a subset of the first and second sets of images, and a corresponding subset of the first and second annotation data, into second training data;
generating a second trained machine learning-based model based on the second training data;
obtaining third training data that represents animals of a further animal category which is different from the at least one animal category, the third training data comprising a third set of images and third annotation data;
refining the second trained machine learning-based model based on the third training data to generate a refined second trained machine learning-based model;
obtaining a fourth set of images of animals included in the further animal category;
operating the refined second trained machine learning-based model on the fourth set of images to generate fourth annotation data comprising fourth location data for the predefined feature points on at least one animal in each image in the fourth set of images; and
aggregating at least a subset of the third and fourth sets of images, and a corresponding subset of the third and fourth annotation data, into fourth training data.

18. A device for processing images of animals, said device being configured to:
obtain first training data, which comprises a first set of images of animals representative of at least one animal category and first annotation data comprising first location data for predefined feature points on at least one animal in each image in the first set of images;
train a first machine learning-based model by use of the first training data to generate a first trained machine learning-based model;

obtain a second set of images of animals;
operate the first trained machine learning-based model on the second set of images to generate second annotation data comprising second location data for the predefined feature points on at least one animal in each image in the second set of images;
aggregate at least a subset of the first and second sets of images, and a corresponding subset of the first and second annotation data, into second training data;
generate a second trained machine learning-based model based on the second training data;
obtain third training data that represents animals of a further animal category which is different from the at least one animal category, the third training data comprising a third set of images and third annotation data;
refine the second trained machine learning-based model based on the third training data to generate a refined second trained machine learning-based model;
obtain a fourth set of images of animals included in the further animal category;
operate the refined second trained machine learning-based model on the fourth set of images to generate fourth annotation data comprising fourth location data for the predefined feature points on at least one animal in each image in the fourth set of images; and
aggregate at least a subset of the third and fourth sets of images, and a corresponding subset of the third and fourth annotation data, into fourth training data.

* * * * *